United States Patent Office 3,410,893
Patented Nov. 12, 1968

3,410,893
SULFUR-CONTAINING CARBAMATES
Leonard Levine, Lake Jackson, Tex., assignor to The Dow Chemical Company, Midland, Mich., a corporation of Delaware
No Drawing. Filed Oct. 14, 1963, Ser. No. 316,172
13 Claims. (Cl. 260—481)

ABSTRACT OF THE DISCLOSURE

A composition which is useful as a stabilizer for chlorinated hydrocarbon solvents of the formula $$R_1OOCNHCR_0R_0CHR_0SR$$

is made by reacting certain alkanethiols with alkyl esters of 1-aziridinyl carboxylic acids in the presence of a Lewis acid.

---

This invention relates to sulfur-containing carbamates useful as stabilizers for haloalkanes and to the preparation of such compositions.

It is known that thiophenol reacts at room temperature with alkyl 1-aziridinylcarboxylates to produce the corresponding alkyl 2-phenylthioethylcarbamate, as disclosed by Iwakura et al. in J. Org. Chem., 26, 4384–8 (1961). Under the same conditions, however, alkanethiols react to little or no extent with alkyl 1-aziridinylcarboxylates.

It has now been found that alkanethiols of from 1 to 10 carbon atoms react with alkyl esters of 1-aziridinylcarboxylic acids in the presence of a Lewis acid (electron acceptor) to produce alkyl 2-alkylthioalkylcarbamates. The reaction may be represented by the following equation

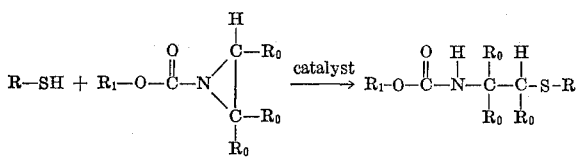

wherein R is an alkyl group of from 1 to 10 carbon atoms, $R_1$ is an alkyl group of from 1 to 6 carbon atoms and $R_0$ is selected from the group consisting of the hydrogen atom and a lower alkyl group. Typical reactants include methanethiol, ethanethiol, propanethiol, 2-propanethiol, butanethiol, 2-butanethiol, pentanethiols, hexanethiols, heptanethiols, octanethiols, nonanethiols and deccanethiols each of which may be reacted with esters such as n-hexyl 2-methyl-1-aziridinylcarboxylate, i-propyl 2,3-diethyl-1-aziridinylcarboxylate, methyl 2-methyl-1-aziridinylcarboxylate and ethyl 1-aziridinylcarboxylate, for example. By choice of the proper reactants, compounds with the desired substituents may be obtained. Although each $R_0$ (which may be the same or different) can be a methyl, ethyl, n-propyl, i-propyl, n-butyl, i-butyl, t-butyl or sec.-butyl group, $R_0$ is preferably a hydrogen atom or a methyl group.

The reaction of the present invention may be carried out at temperatures of from about 10° to 200° C. (preferably from about 50° to 170° C.). The reaction is most advantageously carried out using atomspheric pressure, although autogenous pressure of a pressure of several atmospheres may be used. The reaction may be carried out continuously or batchwise. Reaction mole ratios of thiol to alkyl aziridinylcarboxylate are preferably stoichiometric or from about 1:1 to 2:1, but may vary from 1:2 to 3:1 and still produce sulfur-containing carbamates in good yield.

The catalyst used in the reaction is a Lewis acid (such as $BF_3$, $BCl_3$, $ZnCl_4$, $ZnCl_2$, $H_2SO_4$ or other electron acceptors). Mixtures of catalysts may also be used; for example, a mixture of $BF_3$ and $SnCl_4$ may be employed in the reaction zone. Only a catalytic amount is necessary. Ordinarily, from 0.2 to 5.0 percent by weight of the catalyst (based on the weight of the alkyl aziridinylcarboxylate) is sufficient for a good yield of sulfur-containing carbamate product, with amounts of catalyst of from 1.0 to 3.0 percent being preferred. Without the use of a catalyst, the reaction does not produce the sulfur-containing carbamate compounds of the invention.

The compounds of the invention are useful as stabilizers for methyl chloroform as well as other haloalkanes and amounts of from 2 to 4 percent by weight (based upon the total mixture) are generally sufficient for this purpose. Amounts of up to 15 percent by weight may be used. The inhibited mixtures stop or retard the reaction of the haloalkane with aluminum metal.

The following examples are submitted for the purpose of illustration only and are not to be construed as limiting the scope of the invention in any way.

EXAMPLE I

To a stirred refluxing solution (~98° C.) of 50 grams (0.55 mole) of butanethiol and 1.1 grams of boron trifluoride etherate [$(CH_3CH_2)_2O\cdot BF_3$] was added dropwise 40.1 grams (0.35 mole) of ethyl 1-aziridinylformate (ethyl 1-aziridinylcarboxylate) during 1½ hours with nitrogen flowing through the reaction flask. After cooling to room temperature, the solution was diluted with diethyl ether. The ether solution was washed twice with dilute sodium carbonate solution and four times with water. The solution was then dried over anhydrous calcium sulfate, filtered and concentrated. Further distillation yielded 30 grams of butanethiol and 12.4 grams of ethyl 1-aziridinylcarboxylate. Vacuum distillation of the residue gave 15.5 grams (22 percent of theory) of crude ethyl 2-(butylthio) ethylcarbamate. The compound was refractionated and had the following properties:

Boiling point: 80°–81° C. at 0.1 mm. of Hg.
Refractive index: 1.4755 (24° C., Na D line).

Analysis.—Calculated for $C_9H_{19}NO_2S$. Theory: N, 6.83; S, 15.6. Found: N, 6.85; S, 15.7.

The infrared spectra agreed with the structure of ethyl 2-(butylthio)ethylcarbamate.

EXAMPLE II

Using a procedure similar to that of Example I, 40.3 grams (0.35 moles) of ethyl 1-aziridinylformate was added dropwise to a refluxing mixture of 66 grams (0.56 mole) of hexanethiol and 1.2 grams of boron trifluoride etherate [$(CH_3CH_2)_2O\cdot BF_3$] over a 30 minute period. The mixture was then refluxed for about one hour at 147° C. to 155° C. Vacuum distillation gave 37 grams (45 percent of theory) of crude ethyl 2-(hexylthio)ethylcarbamate. The compound was redistilled and had the following properties:

Boiling point: 107°–109° C. at 0.5 mm. of Hg.
Refractive index: 1.4725 (26° C., Na D line).

Analysis.—Calculated for $C_{11}H_{23}NO_2S$. Theory: N, 6.00; S, 13.7. Found: N, 5.96; S, 14.1.

The infrared spectra indicated that the product was the expected ethyl 2-(hexylthio)ethylcarbamate.

I claim as my invention:
1. A compound of the formula

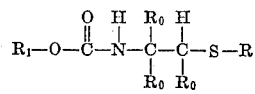

wherein:
(a) R is an alkyl group of from 1 to 10 carbon atoms, (b) $R_1$ is an alkyl group of from 1 to 6 carbon atoms, and (c) $R_0$ is selected from the group consisting of the hydrogen atom and a lower alkyl group of from 1 to 4 carbon atoms.

2. A compound of the formula $$R_1-O-\overset{O}{\overset{\|}{C}}-\overset{H}{\overset{|}{N}}-CH_2CH_2-S-R$$

wherein:

(a) R is an alkyl group of from 1 to 10 carbon atoms, and (b) $R_1$ is an alkyl group of from 1 to 6 carbon atoms.

3. A compound of the formula $$CH_3CH_3-O-\overset{O}{\overset{\|}{C}}-\overset{H}{\overset{|}{N}}-CH_2CH_2-S-R$$

wherein R is an alkyl group of from 1 to 10 carbon atoms.

4. The compound:

$$CH_3CH_2O-\overset{O}{\overset{\|}{C}}-\overset{H}{\overset{|}{N}}-CH_2CH_2-SCH_2CH_2CH_2CH_3$$

5. The compound:

$$CH_3CH_2O-\overset{O}{\overset{\|}{C}}-\overset{H}{\overset{|}{N}}-CH_2CH_2-S-C_6H_{13}$$

6. A process for preparing sulfur-containing carbamates which comprises reacting an alkanethiol of from 1 to 10 carbon atoms with a compound of the formula $$R_1-O-\overset{O}{\overset{\|}{C}}-N\begin{matrix}\overset{H}{\overset{|}{C}}-R_0\\ \\ \underset{R_0}{\overset{|}{C}}-R_0\end{matrix}$$

wherein:

(a) $R_0$ is selected from the group consisting of the hydrogen atom and a lower alkyl group of from 1 to 4 carbon atoms, and (b) $R_1$ is an alkyl group of from 1 to 6 carbon atoms, in the presence of a catalyst selected from the group consisting of the Lewis acids.

7. A process for the preparation of sulfur-containing carbamates which comprises reacting an alkanethiol of from 1 to 10 carbon atoms with an alkyl 1-aziridinylcarboxylate of the formula $$R_1-O-\overset{O}{\overset{\|}{C}}-N\begin{matrix}/CH_2\\|\\ \backslash CH_2\end{matrix}$$

wherein $R_1$ is an alkyl group of from 1 to 6 carbon atoms in the presence of a $BF_3$ catalyst at a temperature of from about 10° to 200° C.

8. The process of claim 7 wherein stoichiometric amounts of alkanethiol and alkyl 1-aziridinylcarboxylate are reacted.

9. A process for preparing ethyl 2-(butylthio)ethylcarbamate which comprises reacting stoichiometric amounts of butanethiol and ethyl 1-aziridinylcarboxylate in the presence of a $BF_3$ catalyst.

10. A process for preparing ethyl 2-(hexylthio)ethylcarbamate which comprises reacting stoichiometric amounts of hexanethiol and ethyl 1-aziridinylcarboxylate in the presence of a $BF_3$ catalyst.

11. A stabilized haloalkane composition containing an inhibiting amount of a compound of the formula $$R_1-O-\overset{O}{\overset{\|}{C}}-\overset{H}{\overset{|}{N}}-\overset{R_0}{\underset{R_0}{\overset{|}{C}}}-\overset{H}{\underset{R_0}{\overset{|}{C}}}-S-R$$

wherein:

(a) R is an alkyl group of from 1 to 10 carbon atoms, (b) $R_1$ is an alkyl group of from 1 to 6 carbon atoms, and (c) $R_0$ is selected from the group consisting of the hydrogen atom and a lower alkyl group of from 1 to 4 carbon atoms.

12. The composition of claim 11 wherein the haloalkane is methyl chloroform.

13. A methyl chloroform composition stabilized against attack by aluminum which contains up to 15 percent based on the weight of the total composition of a compound of the formula $$CH_3CH_2O-\overset{O}{\overset{\|}{C}}-\overset{H}{\overset{|}{N}}-CH_2CH_2-S-R$$

wherein R is an alkyl group of from 1 to 10 carbon atoms.

References Cited

UNITED STATES PATENTS 2,999,886   9/1961   Crabb et al. _____ 260—652.5

FOREIGN PATENTS 631,961   9/1963   Belgium.

OTHER REFERENCES

Jones, "J. Org. Chem.," November 1944, p. 484 260—239E.

Iwakura et al., "Chem. Abstracts," vol. 56 (1962), 8534h-i citing Nippon Kagaku Zasshi: 82, 606–13 (1961).

LORRAINE A. WEINBERGER, Primary Examiner.

M. G. BERGER, Assistant Examiner.